United States Patent
Kusuda et al.

(10) Patent No.: US 8,041,532 B2
(45) Date of Patent: Oct. 18, 2011

(54) METHOD FOR INFORMATION PROCESSING, INFORMATION PROCESSING APPARATUS, AND COMPUTER PROGRAM FOR INFORMATION PROCESSING

(75) Inventors: Hirohisa Kusuda, Tokyo (JP); Daisuke Tsujino, Tokyo (JP); Jun Yamazaki, Tokyo (JP); Yasuhiro Nishide, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 1128 days.

(21) Appl. No.: 11/585,893

(22) Filed: Oct. 25, 2006

(65) Prior Publication Data

US 2007/0129909 A1 Jun. 7, 2007

Related U.S. Application Data

(63) Continuation of application No. PCT/JP2005/021425, filed on Nov. 22, 2005.

(30) Foreign Application Priority Data

Nov. 24, 2004 (JP) ................................ 2004-338412

(51) Int. Cl.
  *G01P 15/00* (2006.01)
(52) U.S. Cl. ........................... 702/141; 702/142; 702/94
(58) Field of Classification Search ............. 702/92–95, 702/141, 142, 150, 151; 700/302
  See application file for complete search history.

(56) References Cited

U.S. PATENT DOCUMENTS

| 3,597,598 | A * | 8/1971 | McAllister et al. ........... 701/220 |
| 7,031,875 | B2 * | 4/2006 | Ellenby et al. ................ 702/150 |
| 2003/0113030 | A1 * | 6/2003 | Kimura et al. ................ 382/247 |
| 2004/0164958 | A1 * | 8/2004 | Park .............................. 345/158 |

FOREIGN PATENT DOCUMENTS

| JP | 2001-272413 | 10/2001 |
| JP | 2002-169645 | 6/2002 |
| JP | 2003-330590 | 11/2003 |
| JP | 2003-330698 | 11/2003 |

OTHER PUBLICATIONS

DoCoMo. Net-Rakuraku phone III F672i2. Retrieved Oct. 13, 2004, from http://web.archive.org/web/20041013050914/http://www.nttdocomo.co.jp/p_s/products/keitai/unique/f672i/f672i2.html, and its English Translation.

DoCoMo. Rakuraku phone III. Retrieved 2007, from http://web.archive.org/web/20080527182857/http://www.nttdocomo.co.jp/product/easy_phone/f672i/topics_03.html, and its English Translation.

* cited by examiner

*Primary Examiner* — Manuel L Barbee
(74) *Attorney, Agent, or Firm* — Kratz, Quintos & Hanson, LLP (57) ABSTRACT

In a measured-value converting process, a shape-condition converting process and an absolute coordinate system converting process (S16) are performed on a value measured by a sensor. In the shape-condition converting process, when a mobile terminal has a shape 1 and shape 2, the converting process is not performed (S12 and S13). When the mobile terminal has a shape 3, a converting process of rotating through 180° around $Y_S$ axis is performed (S14). Moreover, when the mobile terminal has a shape 4, a converting process of rotating through 180° around $Z_S$ axis (S15) is performed. Therefore, even in an information processing apparatus of which a shape changes, a sensor which detects a movement of the information processing apparatus can be used as an input device, irrespective of the shape.

10 Claims, 8 Drawing Sheets

METHOD FOR INFORMATION PROCESSING, INFORMATION PROCESSING APPARATUS, AND COMPUTER PROGRAM FOR INFORMATION PROCESSING

RELATED APPLICATION

This a continuation application of the international patent application No. PCT/JP2005/021425 filed with Application date: Nov. 22, 2005. The present application is based on, and claims priority from, J.P. Application 2004-338412, filed on Nov. 24, 2004, the disclosure of which is hereby incorporated by reference herein its entirety.

BACKGROUND OF THE INVENTION

The present invention relates to a method for information processing, an information processing apparatus, and a computer program for information processing, and more particularly, to a method for information processing in which a sensor which measures a moving condition is used, an information processing apparatus in which the method for information processing is used, and a computer program for executing the method for information processing.

BACKGROUND ART

Various information processing apparatuses starting with a movable communication terminal apparatus have been hitherto used widely. There has been more and more improvement in a quality of functions and increase in number of functions of these information processing apparatuses, and these information processing apparatuses are becoming very convenient for a user using many functions. As an example of the increase in the number of functions, an information processing apparatus which processes data by measuring a movement of the image processing apparatus itself, such as an accelerometer, has appeared.

A mobile terminal (refer to Non-patent Literature 1 for example) which functions as a pedometer by providing an accelerometer is an example of the information processing apparatus which measures the movement of such information processing apparatuses itself. Moreover, apart from this, a mobile communication terminal which includes the accelerometer, and is capable of inputting characters by figuring out in detail the movement of the information processing apparatus (refer to Patent Document 1 for example), and a mobile terminal which is provided with an acceleration sensor or an angular velocity sensor, and used for control in games and other controls (refer to Patent Document 2) for example, has already been disclosed.

Non-patent Document 1: "Raku Raku Phone III F672i", [online], NTT DoCoMo, [searched on Nov. 5, 2004].

Patent Document 1: Japanese Patent Application Laid-open Publication No. 2002-169645

Patent Document 2: Japanese Patent Application Laid-open Publication No. 2001-272413

SUMMARY OF INVENTION

As described above, there is disclosed an information processing apparatus in which a movement of the information processing apparatus is detected by using a sensor which detects a movement of an accelerometer etc.; and by figuring out a condition of the movement, the information processing apparatus is used as an input device.

Incidentally, a shape of a mobile terminal, starting with a clamshell-type folding mobile terminal which is used widely in recent years, a sliding-type mobile terminal, a revolver-type mobile terminal, and an orthogonal two-axis hinge-type mobile terminal in which a display section rotates around an axis which is orthogonal to a folding axis, changes. In a case of such mobile terminal in which the shape changes, according to an installing position of a sensor, even when a user has moved the information processing apparatus with the intention of moving in the same manner, a measurement result obtained by the sensor changes according to a shape of the information processing apparatus at different times.

The present invention is made in view of the abovementioned circumstances, and an object of the present invention is to provide a method for information processing in which a sensor which detects a movement of the information processing apparatus is used as an input device, irrespective of a shape even in a case of the information processing apparatus of which the shape changes, an information processing apparatus, and a computer program for information processing in which the method for information processing is used.

From the first aspect of the present invention, it is a method for information processing comprising steps of measuring a moving condition by a sensor which measures a moving condition of an information processing apparatus; and converting a measured value of a moving condition corresponding to a value measured by the sensor, based on a shape-condition value which depends on a shape of the information processing apparatus.

In this method for information processing, first of all, at the step of measuring the moving condition, the sensor which measures the moving condition of the information processing apparatus, measures the moving condition. This sensor, apart from including an accelerometer which measures a direct moving condition as a matter of course, also includes sensors such as a magnetic sensor which measures a value necessary for calculating a value which denotes a final moving condition. Next, at the step of converting a measured value, a moving condition measured-value which depends on the value measured by the sensor, based on the shape-condition value depending on the shape of the information processing apparatus, is changed.

In this case, "the shape-condition value depending on the shape of the information processing apparatus" means a value which denotes a folded condition or an unfolded condition in a case of a folding information processing apparatus. Moreover, "the moving condition measured-value corresponding to the value measured by the sensor" apart from including the value measured by the sensor as a matter of course, also includes a value calculated based on the value measured by the sensor.

Therefore, according to the method for information processing according to the present invention, even in the information processing apparatus of which the shape changes, the sensor which detects the movement of the information processing apparatus can be used as an input device, irrespective of the shape.

Moreover, in the method for information processing of the present invention, the conversion in the step of converting the measured value can be let to be a coordinate conversion. In this case, by using upon converting the moving condition measured-value, to a fixed coordinate system which is fixed to a certain portion of an information terminal apparatus, and to other coordinate system which is not fixed to the information terminal apparatus, it is possible to use a value in the coordinate system which is required by an application which uses that converted measured-value. Moreover, this coordinate conversion is let to be a conversion which includes a conversion which becomes the same conversion as in a case when the coordinate conversion is performed as a result, even when the conversion is not the coordinate conversion.

Moreover, in the method for information processing of the present invention, the coordinate conversion in the step of converting the measured-value can be let to be a coordinate conversion from a sensor coordinate system which is fixed with respect to the sensor, to a display-section coordinate system which lets a direction of a display surface of a display device which is an output device of the information processing apparatus, to be one axial direction. In this case, before and after the change of shape, a conversion to the coordinate system with the direction of the display surface as a base is possible. Therefore, the user, without considering the change of shape, can use the sensor which detects the movement as an input device while looking at the display screen. In this case, the coordinate system "which lets the direction of the display surface to be one axial direction" means a coordinate system in which a direction of facing of the display surface is one axial direction, and does not mean that an origin of that coordinate system is fixed to the display surface.

Moreover, in the method for information processing of the present invention, the moving condition measured-value can be let to be an acceleration value and an attitude angle value of the information processing apparatus. In this case, by letting the value measured by the sensor, or moving condition measured-value which is a value calculated from the value measured by the sensor, to be the acceleration value and the attitude angle value, it is possible to use the method for information processing of the present invention by using the moving condition measured-value in which the moving condition of the information processing apparatus is expressed in more detail.

Moreover, in the method for information processing of the present invention, the conversion of the moving condition measured-value in the step of converting the measured value can be let to be executed by a middleware in a software structure. In this case, the step of converting the measured value is performed by the so-called middleware which is at a level lower than an application. Therefore, no load is exerted on the application which uses the converted measured-value, and the sensor which detects the movement can be used as the input device.

Moreover, by executing conversion of the measured value by using the middleware, it is possible to develop each application which uses the converted measured-value without taking into consideration the change of shape for each information processing apparatus, and to reduce a load of developing. Moreover, by processing the step of converting the measured value by using a middleware which uses a machine language, it is possible to perform processing at a high speed than by executing an application which uses an intermediate language such as JAVA (registered trademark).

From the second aspect of the present invention, the information processing apparatus of which the shape changes, comprises a sensor section which includes a sensor which measures a moving condition of the information processing apparatus itself, a measured-value converting section which converts a measured value of the moving condition corresponding to a value measured by the sensor, based on a shape-condition value which depends on the shape of the information processing apparatus, and a measured-value using application section, which uses a converted measured-value which is converted by the measured-value converting section.

In this information processing apparatus, the sensor section includes the sensor which measures the movement of the information processing apparatus itself. This sensor, similarly as described in the method for information processing mentioned earlier, apart from including the accelerometer which measures the direct moving condition as a matter of course, also includes sensors such as a magnetic sensor which measures the value necessary for calculating the value which denotes a final moving condition. Moreover, the measured-value converting section converts the measured value of the moving condition which depends on the value measured by the sensor, based on the shape-condition value depending on the shape of the information processing apparatus.

In this case, "the shape-condition value depending on the shape of the information processing apparatus", similarly as described in the method for information processing mentioned earlier, means a value which denotes the folded condition or the unfolded condition in the case of the folding information processing apparatus. Moreover, "the moving condition measured-value corresponding to the value measured by the sensor", similarly as described in the method for information processing mentioned earlier, apart from including the value measured by the sensor as a matter of course, also includes the value calculated based on the value measured by the sensor.

Moreover, the application section using the measured value uses the converted measured-value which is converted by the measured-value converting section. In this case, "using the converted measured value" means using for data processing and control processing of hardware, such as using for display processing corresponding to a value of the converted measured-value in the application program. This application section using the measured value may be an application program which is started-up directly by the user and used, or may be a computer program used internally.

Therefore, according to the information processing apparatus of the present invention, even in the case in which the shape changes, the sensor which detects the movement can be used as the input device.

Moreover, in the information processing apparatus of the present invention, the conversion in the measured-value converting section can be let to be the coordinate conversion. In this case, by using upon converting the moving condition measured-value, to the fixed coordinate system which is fixed to a certain portion of the information terminal apparatus, and to other coordinate system which is not fixed to the information terminal apparatus, it is possible to use the value in the coordinate system which is required by the application which uses that converted measured value. Moreover, this coordinate conversion is let to be the conversion which includes the conversion which becomes the same conversion as in the case when the coordinate conversion is performed as a result, even when the conversion is not the coordinate conversion.

Moreover, in the information processing apparatus of the present invention, the coordinate conversion in the measured-value converting section can be let to be the coordinate conversion from the sensor coordinate system which is fixed with respect to the sensor, to the display-section coordinate system which lets the direction of the display surface of the display device which is the output device, to be one axial direction. In this case, before and after the change of shape, the conversion to the coordinate system with the direction of the display surface as the base is possible. Therefore, the user, without considering the change of shape, can use the sensor which detects the movement as the input device while looking at a display screen. In this case, the coordinate system "which lets the direction of the display surface to be one axial direction"

means the coordinate system in which the direction of facing of the display surface is one axial direction, and does not mean that the origin of that coordinate system is fixed to the display surface.

Moreover, the information processing apparatus of the present invention can be let to further comprise a wireless communication section for communicating with a base station of a mobile communication network. In this case, even in a case of being a terminal unit which is capable of mobile communication, the information processing apparatus of the present invention can be used.

From the third aspect of the present invention, it is a computer program for information processing which causes the information processing apparatus to execute, acquiring the measured value of the moving condition which depends on the value measured by the sensor which measures the moving condition, converting the measured value of the moving condition based on the shape-condition value which depends on the shape of the information processing apparatus, and notifying the converted measured-value to a computer program which uses the converted measured-value.

In the computer program for information processing, in acquiring the measured value, the measured value of the moving condition corresponding to the value measured by the sensor which measures the moving condition is acquired. This sensor, similarly as described in the method for information processing mentioned earlier, apart form including the accelerometer which measures the direct moving condition as a matter of course, also includes sensors such as the magnetic sensor which measures the value necessary for calculating the value which denotes the final moving condition. Moreover, "the moving condition measured-value corresponding to the value measured by the sensor", similarly as described in the method for information processing mentioned earlier, apart from including the value measured by the sensor as a matter of course, also includes the value calculated based on the value measured by the sensor.

Next, in converting the measured value of the moving condition, the moving condition measured-value is converted based on the shape-condition value which depends on the shape of the information processing apparatus. In this case, "the shape-condition value which depends on the shape of the information processing apparatus" means, similarly as described in the method for information processing mentioned earlier, the value which denotes the folded condition or the unfolded condition in the case of folding information processing apparatus, and in a case of using an orthogonal two-axis hinge, is a value which denotes a condition in which the display surface further faces a direction same as a direction of an operating surface, or a condition in which the display surface faces a direction opposite to the direction of the operating surface.

Then, in notifying the converted measured-value, the converted measured-value is notified to the computer program which uses the converted measured-value. In this case, "the computer program which uses the converted measured-value" means a computer program which performs a data processing and control processing of hardware, such as performing display processing according to the value of the converted measured-value in the application program. The computer program may be an application program which is started-up directly by the user and used, or may be a computer program which is used internally.

Therefore, according to the computer program for information processing of the present invention, even in the information processing apparatus of which the shape changes, the sensor which detects the movement of the information processing apparatus can be used as the input device.

As described above, according to a method for information processing of the present invention, and an information processing apparatus and a computer program for information processing in which the method for information processing is used, even in an information processing apparatus of which a shape changes, an effect that a sensor which detects a movement of the information processing apparatus can be used as an input device, is shown.

DETAILED DESCRIPTION

An embodiment of the present invention will be described below while referring to FIG. 1A to FIG. 8.

Figure 1A:
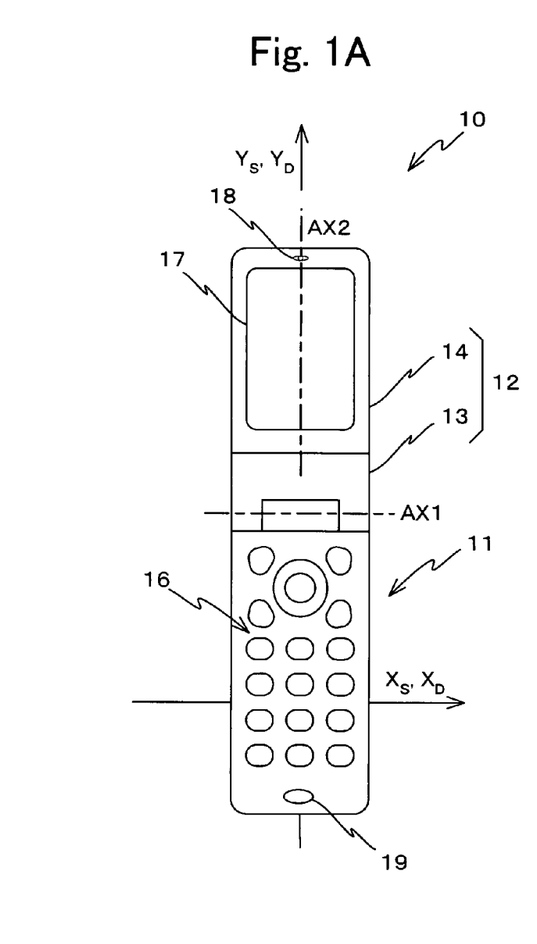
FIG. 1A is a diagram showing schematically, a front-side external view of the first shape of a mobile terminal 10 according to an embodiment of the present invention.

FIG. 1A to FIG. 4B show external structure of each shape which may be taken by a mobile terminal 10. Here, in FIG. 1A and FIG. 1B show respectively a front view and a rear view of an external structure of the first shape which is a shape when the mobile terminal 10 is used normally.

Figure 1B:
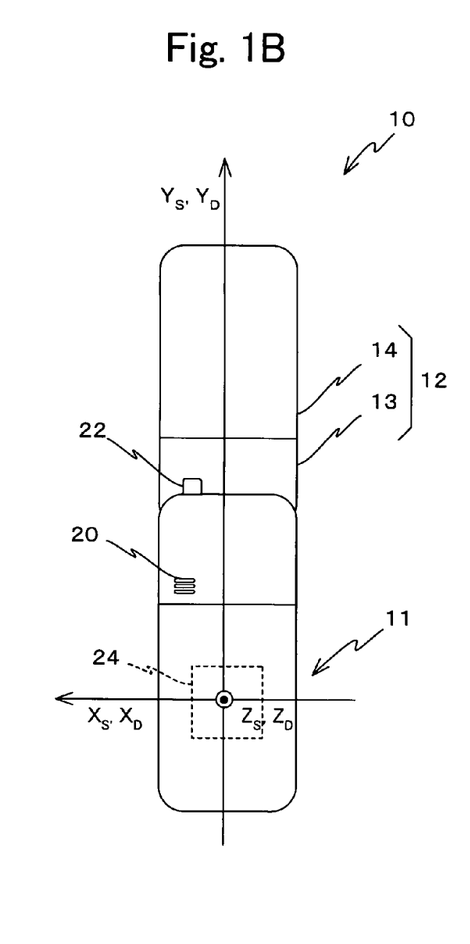
FIG. 1B is a diagram showing schematically, a rear-side external view of the first shape of the mobile terminal 10 according to the embodiment of the present invention.

As shown in FIG. 1A and FIG. 1B, the mobile terminal 10 includes a first portion 11, and a second portion 12 which is rotatably supported by an axis AX1 as an axis of rotation, with respect to the first portion 11. The second portion 12 includes a base section 13 which is disposed towards the first portion 11, and a display section 14 which is rotatably supported by an axis AX2, with respect to the base section 13.

As shown in FIG. 1A, (a) an operating section 16 in which operation keys such as a numerical key pad, are arranged, and (b) a microphone 19 for inputting voice during telephone conversation are disposed on the first portion 11, and (c) a display unit 17 which is a liquid-crystal display device which displays operation instructions, an operation status, and a received message etc., and (d) a speaker 18 for communication which reproduces a voice signal transmitted from a communication counterpart during conversation, are disposed on the display section 14.

Moreover, as shown in FIG. 1B, (e) a speaker for guidance 20 for generating a ring tone and guidance sound, and (f) an antenna 22 for transferring a wireless signal with the base station are provided in the first portion 11, and (g) two accelerometers in a direction of an $X_S$ axis and a $Y_S$ axis, in a sensor coordinate system $X_S Y_S Z_S$ which will be described later, and a movement detecting sensor section 24 which has a magnetometer in the direction of the $X_S$ axis, the $Y_S$ axis, and in a direction of a $Z_S$ axis are provided inside the first portion 11.

In the mobile telephone terminal 10, in a rear view of FIG. 1B, the sensor coordinate system $X_S Y_S Z_S$ fixed to the first portion 11 is defined as the $Z_S$ axis in a direction from a reverse side of a paper surface to a front side, the $Y_S$ axis in an upward direction, and the $X_S$ axis in a left direction of a paper surface, from a center of the movement detecting sensor section 24 of the first portion. Moreover, a display-section coordinate system $X_D Y_D Z_D$ has an origin fixed at a position same as a position of the sensor coordinate system, and axes defined as a coordinate system depending on length and breadth, and a direction of a display surface, and in FIG. 1A and FIG. 1B is a coordinate system same as the sensor coordinate system.

Figure 2A:
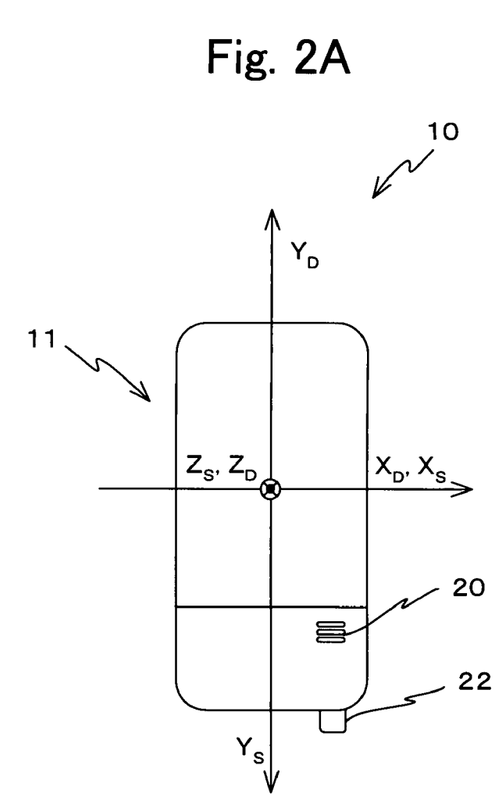
FIG. 2A is a diagram showing schematically, a front-side external view of the second shape of the mobile terminal 10 according to the embodiment of the present invention.
Figure 2B:
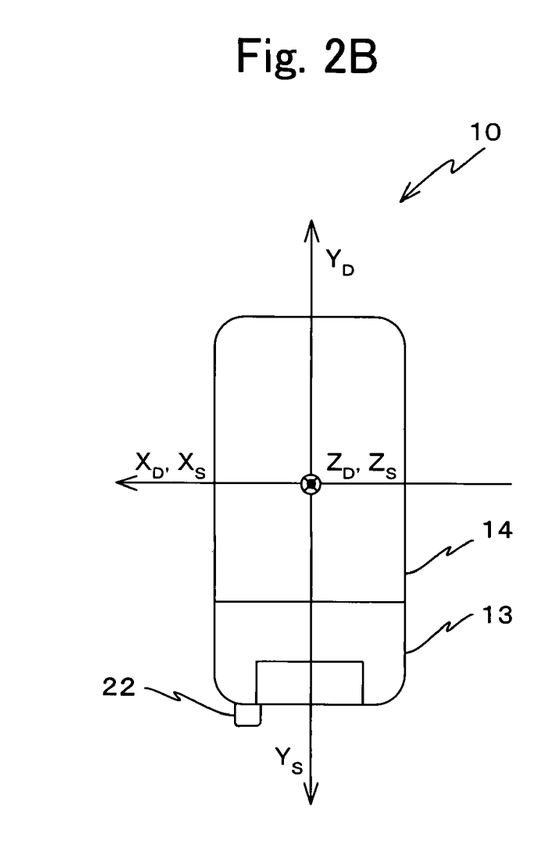
FIG. 2B is a diagram showing schematically, a rear-side external view of the second shape of the mobile terminal 10 according to the embodiment of the present invention.
Figure 3A:
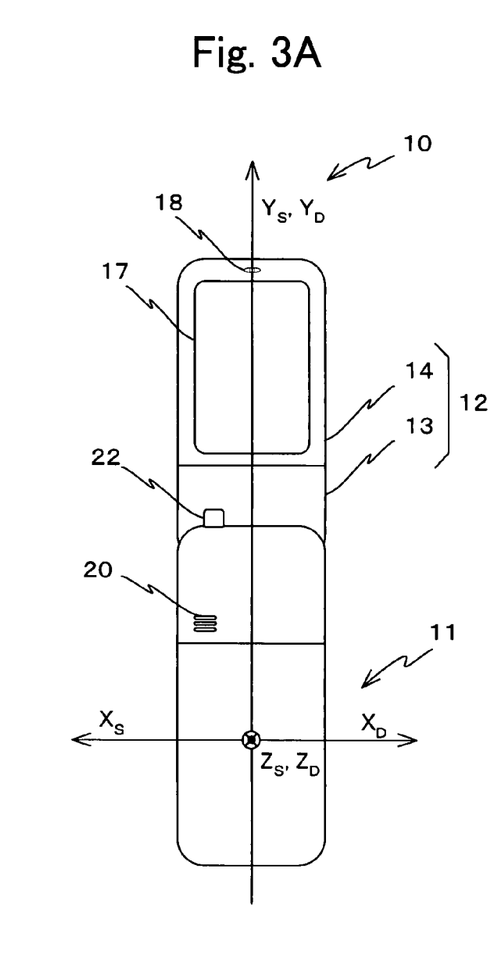
FIG. 3A is a diagram showing schematically, a front-side external view of the third shape of the mobile terminal 10 according to the embodiment of the present invention.
Figure 3B:
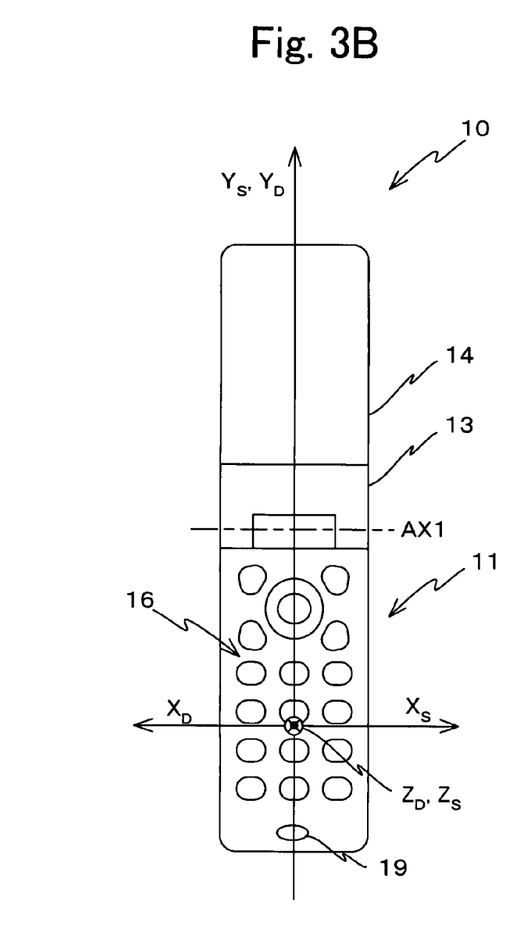
FIG. 3B is a diagram showing schematically, a rear-side external view of the third shape of the mobile terminal 10 according to the embodiment of the present invention.
Figure 4A:
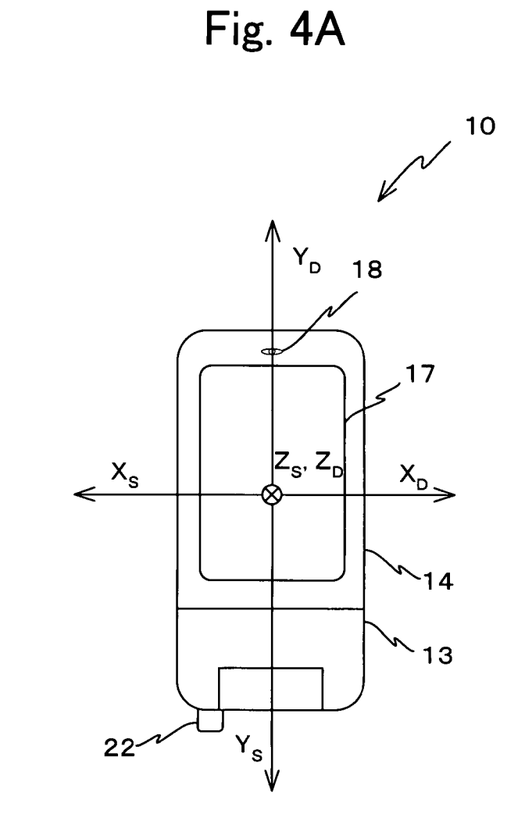
FIG. 4A is a diagram showing schematically, a front-side external view of the fourth shape of the mobile terminal 10 according to the embodiment of the present invention.

In FIG. 2A to FIG. 4B, irrespective of whether a display surface of the display unit 17 is visible or invisible in FIG. 2A, FIG. 3A, and FIG. 4A, similarly as in FIG. 1A, a view in which the display surface is let to be a front surface is shown as a front view. Moreover, in FIG. 2B, FIG. 3B, and FIG. 4B, a rear view with respect to the front view of the FIG. 2A, FIG. 3A, and FIG. 4A is shown. Therefore, a direction of each coordinate axis of the display-section coordinate system $X_D Y_D Z_D$ is same in FIG. 1A, FIG. 2A, FIG. 3A, and FIG. 4A. Moreover, the direction of each coordinate axis of the display-section coordinate system $X_D Y_D Z_D$ is same in FIG. 1B, FIG. 2B, FIG. 3B, and FIG. 4B.

In FIG. 2A and FIG. 2B, there are shown a front view and a rear view respectively, of an external structure of a second shape which is a shape when the mobile terminal 10 is folded with the axis AX1 as an axis of rotation, from the first shape of FIG. 1A and FIG. 1B such that the display surface of the display unit 17 is overlapped face to face with an operating surface of the operating section 16. In FIG. 2A, in the sensor coordinate system $X_S Y_S Z_S$, the $X_S$ direction not being different from a right direction of the paper surface, but being folded, the $Y_S$ direction becomes a downward direction of the paper surface, and the $Z_S$ direction becomes a direction heading from the reverse side to the front side. Whereas, in the display-section coordinate system $X_D Y_D Z_D$, letting the origin to be the same as the origin of the sensor coordinate system $X_S Y_S Z_S$, each of the directions of the $X_D$ axis, the $Y_D$ axis, and the $Z_D$ axis is same as in a case in FIG. 1A.

In FIG. 3A and FIG. 3B, there are shown a front view and a rear view respectively, of an external structure of a third shape which is a shape of the mobile terminal 10 when the display unit 17 and the operating section 16 are rotated through 180° with the axis AX2 as the axis of rotation from the first shape, such that the display surface of the display unit 17 and the operating surface of the operating surface 16 face the opposite directions. In FIG. 3A, in the sensor coordinate system $X_S Y_S Z_S$, the Ys direction not being different from an upward direction of the paper surface, but being rotated through 180° around the axis AX2, the $X_S$ direction becomes a left direction of the paper surface, and the $Z_S$ direction becomes a direction heading from the reverse side to the front side. Whereas, in the display-section coordinate system $X_D Y_D Z_D$, letting the origin to be the same as the origin of the sensor coordinate system $X_S Y_S Z_S$, each of the directions of the $X_D$ axis, the $Y_D$ axis, and the $Z_D$ axis is same as in the case in FIG. 1A.

Figure 4B:
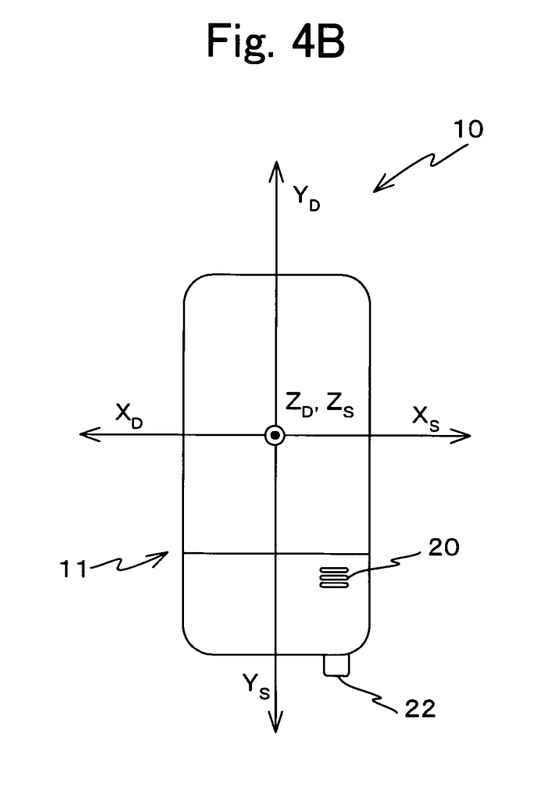
FIG. 4B is a diagram showing schematically, a rear-side external view of the fourth shape of the mobile terminal 10 according to the embodiment of the present invention.

In FIG. 4A and FIG. 4B, there are shown a front view and a rear view respectively, of an external structure of a fourth shape which is a shape when the mobile terminal 10 is folded with the axis AX1 as an axis of rotation, from the third shape of FIG. 3B, such that the display surface of the display unit 17 and the operating section 16 face the same direction. In FIG. 4A, in the sensor coordinate system $X_S Y_S Z_S$, the $Z_S$ direction does not differ from a direction heading from the front to the rear. However, due to being rotated through 180° around the AX2 axis, the $X_S$ direction becomes the left direction of the paper surface. Moreover, being folded, the $Y_S$ direction becomes the downward direction of the paper surface. Whereas, in the display-section coordinate system $X_D Y_D Z_D$, letting the origin to be the same as the origin of the sensor coordinate system $X_S Y_S Z_S$, each of the directions of the $X_D$ axis, the $Y_D$ axis, and the $Z_D$ axis is same as in the case in FIG. 1A.

Figure 5:
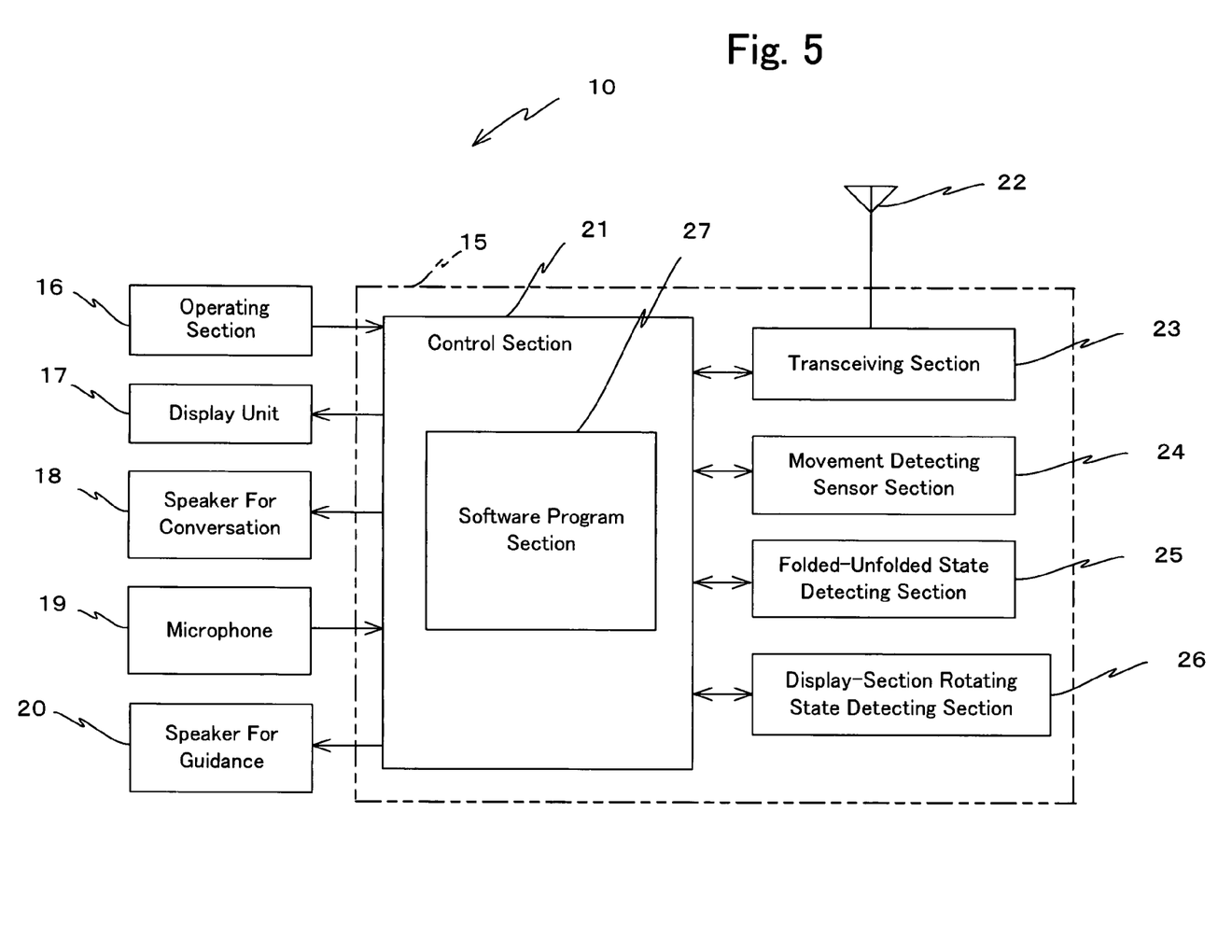
FIG. 5 is a diagram showing a configuration of an internal system 15 of the mobile terminal 10 of FIG. 1A to FIG. 4B.

Moreover, as shown in FIG. 5, an internal system 15 of the mobile terminal 10 includes (i) a control section 21, (ii) a transmitting and receiving section 23, (iii) a movement detecting sensor section (MDS) 24, (iv) a folded-unfolded state detecting section (FSD) 25, and (v) a display-section rotating condition detecting section (DRD) 26. The control section 21 performs an integrated control of an operation of the entire mobile terminal 10. The transmitting and receiving section 23 performs wireless communication through the antenna 22. The movement detecting sensor section (MDS) 24 includes two accelerometers in the direction of the $X_S$ axis and the $Y_S$ axis, and a magnetometer in the direction $X_S$ axis, the $Y_S$ axis, and the $Z_S$ axis. The folded-unfolded state detecting section (FSD) 25 detects an unfolded state in which the display section 17 and the operating section 16 are rotated around the AX1 axis to unfold the mobile terminal 10 as shown in FIG. 1 or FIG. 3, and a folded state as shown in FIGS. 2A and 2B or FIGS. 4A and 4B. The display-section rotating state detecting section (DRD) 26 detects a rotating state which is a shape such as the third shape or the fourth shape in which the display section 14 is rotated with respect to the base section 13 around the axis AX2, and a non-rotating state which is not a rotating state as shown in FIGS. 1A and 1B or FIGS. 2A and 2B.

Figure 6:
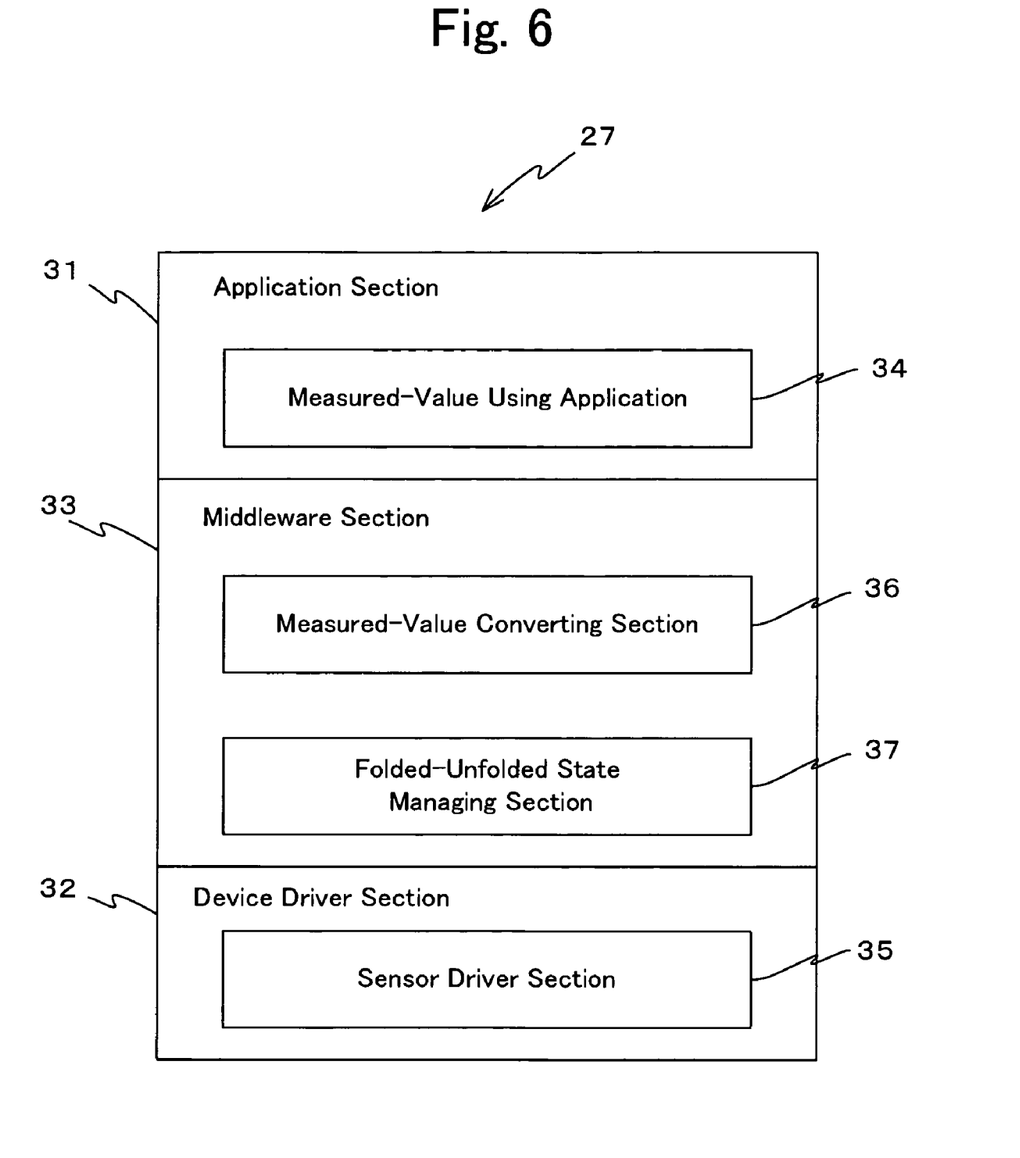
FIG. 6 is a diagram showing a configuration of a software program section 27 of FIG. 5.

In this embodiment, the control section 21 has a software program section 27 which is a computer program for processing by a central processing unit (CPU). The software program section 27, as shown in FIG. 6, includes (i) an application section 31, (ii) a device driver section 32, and (iii) a middleware section 33. The application section 31 includes various application software which is used in the mobile terminal 10. The device driver section 32 controls various hardware such as the operating section 16, and converts information of these hardwares to a format which can be processed easily. The middleware section 33 is between the application section 31 and the device driver section 32. The middleware section 33 makes a request for processing to each device driver, for causing each of the hardware to make a request for application, converts information from the device driver to information which can be processed easily by the application, and notifies the converted information to the application.

Moreover, the application section 31 has a measured-value using application (MUA) 34 which performs processing based on a value measured by the movement detecting sensor section 24. The device driver section 32 has a sensor driver section (SDR) 35 which includes a device driver of the display-section rotating state detecting section 26, the folded-unfolded state detecting section 25, and the movement detecting sensor section 24.

Furthermore, the middleware section 33 includes a shape-condition controlling section (FSM) 37 and a measured-value converting section (MVC) 36. The shape-condition controlling section (FSM) 37 is notified via the sensor driver section 35 from the folded-unfolded state detecting section 25 about the folded/unfolded state, and from the display-section rotating condition detecting section 26 about the rotating/non-rotating state. The shape-condition controlling section (FSM) 37 makes a judgment of the first shape to the fourth step, and controls that state. The measured-value converting section (MVC) 36 converts the measured value measured by the movement detecting sensor section 24 to a format which can be used in the measured-value using application 34.

In this embodiment, a measured-value converting process performed by the measured-value converting section 36 is a shape-condition conversion and an absolute coordinate system conversion. In the shape-condition conversion, a value measured by the sensor which is measured in the movement detecting sensor section 24 is converted by a shape condition which is managed in the shape-condition controlling section 37. In the absolute coordinate system conversion, the value measured by the sensor is not converted to a moving condition value in a relative coordinate system which is fixed to a terminal, but is converted to a moving condition value in a coordinate system (hereinafter, referred to as "absolute coordinate system") having each of a perpendicularly upward direction, a north direction, and an east direction as a coordinate axis.

In the shape condition conversion, the conversion is from the sensor coordinate system $X_S Y_S Z_S$ to the display-section coordinate system $X_D Y_D Z_D$. However, in this embodiment, a conversion in the second shape which is a shape in which the display unit 17 has not appeared on an outer surface side, is performed. Concretely, when a value measured by the sensor of the sensor coordinate system $X_S Y_S Z_S$ and a value measured by the sensor of the display-section coordinate system $X_D Y_D Z_D$ are let to be $(X_S, Y_S, Z_S)$ and $(X_D, Y_D, Z_D)$ respectively, a conversion in a case of the third shape is a conversion by rotating through 180° with the Y axis as the axis of rotation, as shown in expression (1), and a conversion in a case of the fourth shape is a conversion by rotating through 180° with the Z axis as the axis of rotation, as shown in expression (2). Moreover, no conversion is performed in a case of the first shape and the second shape.

[Numerical expression 1]
$$\begin{pmatrix} x_D \\ y_D \\ z_D \end{pmatrix} = \begin{pmatrix} -1 & 0 & 0 \\ 0 & 1 & 0 \\ 0 & 0 & -1 \end{pmatrix} \begin{pmatrix} x_S \\ y_S \\ z_S \end{pmatrix} \quad (1)$$

[Numerical expression 2]
$$\begin{pmatrix} x_D \\ y_D \\ z_D \end{pmatrix} = \begin{pmatrix} -1 & 0 & 0 \\ 0 & -1 & 0 \\ 0 & 0 & 1 \end{pmatrix} \begin{pmatrix} x_S \\ y_S \\ z_S \end{pmatrix} \quad (2)$$

In the absolute coordinate system conversion, an acceleration value in a direction of the $X_D$ axis and the $Y_D$ axis, and a magnetic-flux density value in a direction of the $X_D$ axis, the $Y_D$ axis, and the $Z_D$ axis, which are values measured by the sensor, which are subjected to the shape condition conversion are converted to an attitude angle around the X axis, the Y axis, and the Z axis in the absolute coordinate system.

In this embodiment, the control section 21 apart from including the central processing unit (CPU) mentioned above, includes units such as a digital-signal processor (DSP), and a storage device of a non-volatile and volatile type, and operation control of functions mentioned above is performed.

Next, a method for information processing for using the moving condition value when the shape of the mobile terminal 10 which is structured as described above, will be explained.

Figure 7:
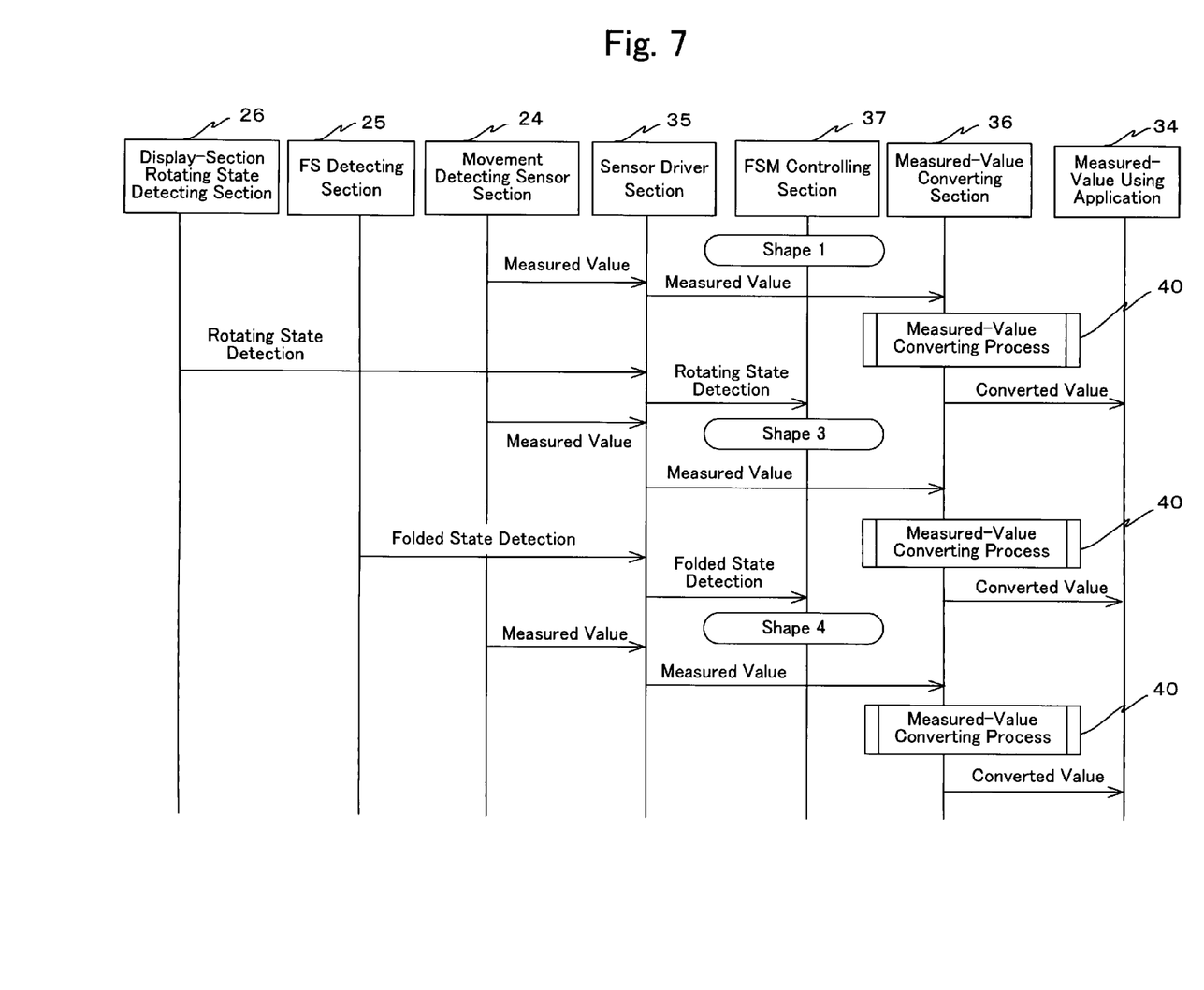
FIG. 7 is a sequence diagram for explaining a method for information processing of the mobile terminal 10 of FIG. 1A to FIG. 4B.

As shown in FIG. 7, first of all, in the shape condition controlling section 37 of the mobile terminal 10, in a case when a condition of the first shape is managed, the value measured by the sensor which is measured by the movement detecting sensor section 24 is notified to the measured-value converting section 36 via the sensor driver section 35. The measured-value converting section 36 to which the value measured by the sensor is notified performs a measured-value converting process.

Figure 8:
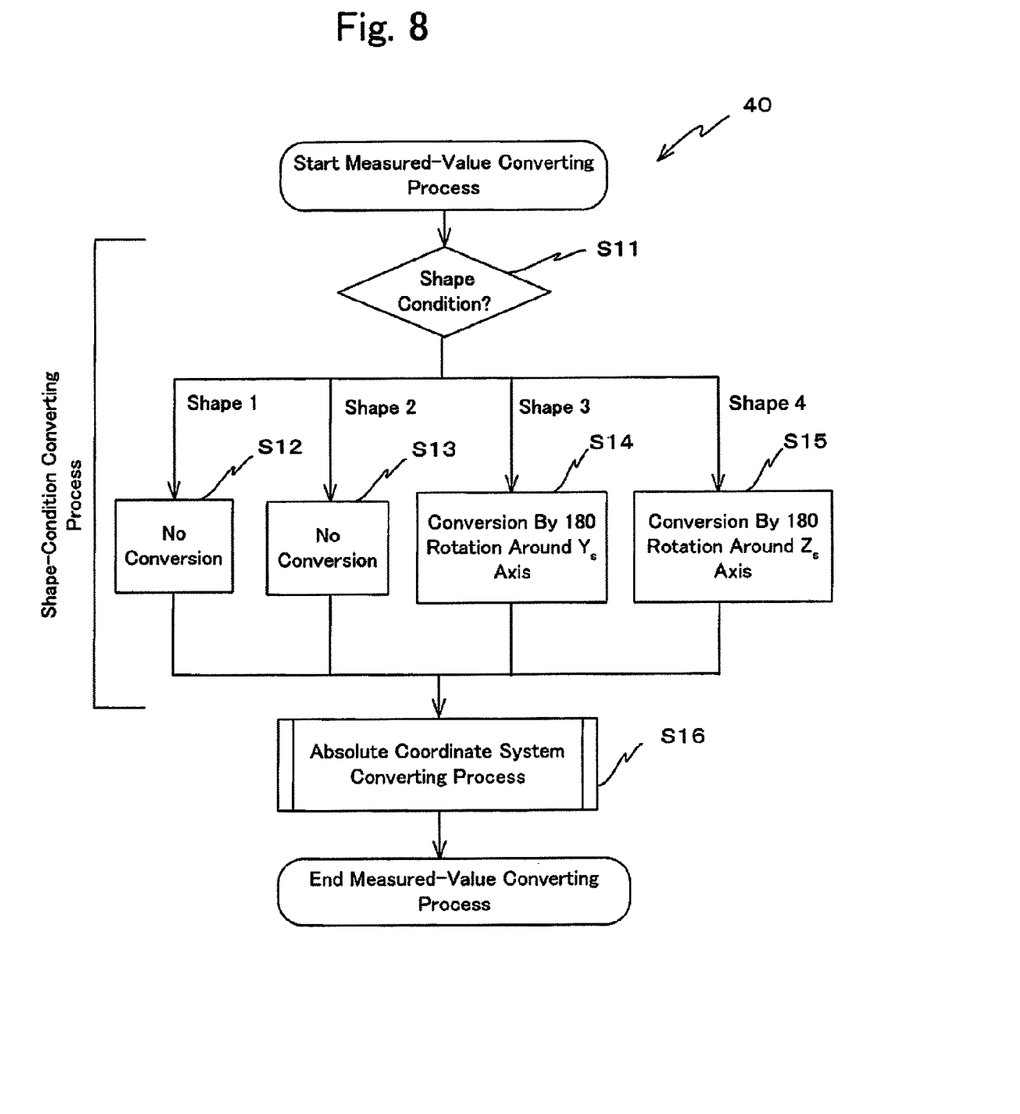
FIG. 8 is a flowchart for explaining a measured-value converting process 40 of FIG. 7.

In the measured-value converting process, as shown in FIG. 8, at step S11, the measured-value converting section 36 makes a query about the shape condition to the shape-condition controlling section 37. In this embodiment, when the shape condition is confirmed to be the first shape, the process moves to step S12, and the shape-condition converting process is terminated without converting the value. Next, at step S16, the absolute coordinate system converting process described above, is performed, and the measured-value converting process is terminated. Referring back to FIG. 7, the measured-value which is converted is notified to the measured-value using application 34, and the measured-value using application 34 displays a process result on the display unit 17.

Next, when the user rotates the display section 14 with respect to the base section 13, around the axis AX2 as a central axis, the display-section rotating state detecting section 26 detects the rotating state, and notifies to the shape-condition controlling section 37 via the sensor driver 35. The shape-condition controlling section 37 to which the rotating state is notified, changes the shape condition to the third shape. Then, as the movement detecting sensor section 24 measures the movement, similarly as in the case of the first shape, the value measured by the sensor, is notified to the measured-value converting section 36 via the sensor driver 35, and the measured-value converting section 36 performs the measured-value converting process.

In the measured-value converting process, at step S11 in FIG. 8, the measured-value converting section 36 makes a query about the shape condition to the shape-condition controlling section 37. When the shape condition is confirmed to be the third shape, the process moves to step S14, a process of rotating through 180° around the $Y_S$ axis is performed, and the shape-condition converting process is terminated. Next, at step S16, the absolute coordinate system converting process described above is performed, and the measured-value converting process is terminated. Referring back to FIG. 7, the measured value which is converted is notified to the measured-value using application 34, and the measured-value using application 34 displays a process result on the display unit 17.

Furthermore, when the user rotates the second portion 12 with respect to the first portion 11 around the axis AX1 as a central axis, the folded-unfolded state detecting section 25 detects the folded state, and notifies to the shape-condition controlling section 37, via the sensor driver 35. The shape-condition controlling section 37 to which the rotating state is notified, changes the shape condition to the fourth shape. Then, as the movement detecting sensor section 24 measures the movement, similarly as in the case of the first shape, the value measured by the sensor is notified to the measured-value converting section 36 via the sensor driver 35, and the measured-value converting section 36 performs the measured-value converting process.

In the measured-value converting process, at step S11 in FIG. 8, the measured-value converting section 36 makes a query about the shape condition to the shape-condition controlling section 37. When the shape condition is confirmed to be the fourth shape, the process moves to step S14, a process of rotating through 180° around the $Z_S$ axis is performed, and the shape-condition converting process is terminated. Next, at step S16, the absolute coordinate system converting process described above is performed, and the measured-value converting process is terminated. Coming back to FIG. 7, an acceleration which is measured and the attitude angle which is a measured value which is converted, are notified to the measured-value using application 34, and the measured-value using application 34 displays a process result on the display unit 17.

In this embodiment, in the second shape, the display unit 17 is hidden on an inner side, and the user being unable check the display unit 17, cannot use the measured-value using application 34. Therefore, as described earlier, in this embodiment, at step S11 in FIG. 8, when the shape is confirmed to be the second shape, in the shape condition converting, no conversion whatsoever is performed.

As described above, in this embodiment, when the mobile terminal 10 has the first shape or the second shape, in the measured-value converting process, only the absolute coordinate system converting process is performed on the value measured by the sensor. Moreover, when the mobile terminal 10 has the third shape, in the measured-value converting process, the shape-condition converting process of rotating through 180° around the $Y_S$ axis, and the absolute coordinate system converting process are performed on the value measured by the sensor. Moreover, when the mobile terminal has the fourth shape, in the measured-value converting process, the shape-condition converting process of rotating through 180° around the $Z_S$ axis, and the absolute coordinate system converting process are performed on the value measured by the sensor.

Therefore, according to this embodiment, in the mobile terminal 10 of which the shape changes, it is possible to use the movement detecting sensor section 24 which detects the movement, as the input device. Moreover, by providing the measured-value converting section 36 in the middleware section 33, each application which uses the converted measured-value can be processed without taking into consideration the shape change for each information processing apparatus, and a load of development and processing can be reduced.

In this embodiment, to simplify the explanation, the shape-condition converting process is performed before the absolute coordinate system converting process. However, the shape-condition converting process may be performed after the absolute coordinate system converting process. In this case, after converting to an attitude angle around the X axis, the Y axis, and the Z axis in the absolute coordinate system, the shape-condition converting process is performed on these attitude angles.

Moreover, in this embodiment, in the second shape, the converting process according to the shape is not performed. However, the converting process according to the shape may be performed.

Moreover, in the mobile terminal 10 of this embodiment, one display unit 17 is provided. Whereas, in the mobile terminal 10 for example, in an information processing apparatus which is provided with a plurality of display devices by providing a sub-display device on a rear surface of the display surface of the display unit 17, a coordinate conversion in which a direction of the display surface of the display device other than the display unit 17, such as the sub-display, is let to be one axial direction, may be performed. Furthermore, according to the shape of the information processing apparatus, a coordinate conversion in which a direction of a display surface of another display device such as the sub-device is let to be one axial direction may be performed.

Moreover, in the this embodiment, the value measured in the movement detecting sensor section 24 is let to be the acceleration value in a direction of the $X_S$ axis, as well as the $Y_S$ axis, and a magnetic-flux density value in a direction of the $X_S$ axis, the $Y_S$ axis, and the $Z_S$ axis. However, the value measured in the movement detecting sensor section 24 may be let to be an acceleration value in the direction of the $X_S$ axis, the $Y_S$ axis, and the $Z_S$ axis, and a magnetic-flux density value in the direction of the $X_S$ axis and the $Y_S$ axis, and on the other hand it is even applicable when the number of axis directions in which the value can be measured is even less than aforementioned those. Furthermore, even when the value measured by the sensor is a value other than the acceleration value and the magnetic-flux density value, the value is applicable.

Moreover, in this embodiment, the moving condition measured-value is let to be the acceleration value and the magnetic-flux density value. However, a value other than the acceleration value and the magnetic-flux density value may be obviously let to be the moving condition measured value.

Moreover, in this embodiment, the movement detecting sensor section 24 is let to be in the first portion 11. However, the movement detecting sensor section 24 may be let to be in the base section 13 and the display section 14 of the second portion 12.

Moreover, in this embodiment, the mobile terminal is let to be an orthogonal two-axis hinge-type mobile terminal. However, the information processing apparatus may be let to other information processing apparatus of which the shape changes, such as a clamshell-type, a sliding-type, and a revolver-type.

Moreover, in this embodiment, the conversion is let to be performed by the shape-condition value in the shape from the first shape to the fourth shape. Whereas, the conversion may be let to be performed by using a shape-condition value such as an angle which denotes a shape halfway through, during such change of shape. For example, in the case of changing the shape from the first shape to the third shape in this embodiment, in a shape which is obtained by rotating through α angle from the first shape, a conversion as in expression (3) may be performed.

[Numerical expression 3] (3)

$$\begin{pmatrix} x_D \\ y_D \\ z_D \end{pmatrix} = \begin{pmatrix} \cos\alpha & 0 & -\sin\alpha \\ 0 & 1 & 0 \\ \sin\alpha & 0 & \cos\alpha \end{pmatrix} \begin{pmatrix} x_S \\ y_S \\ z_S \end{pmatrix}$$

Moreover, in this embodiment, the direction of each of the $Y_D$ axis and the $X_D$ axis of the display-section coordinate system $X_DY_DZ_D$ is let to be fixed in a length and breadth direction of the display surface of the display unit 17. However, direction of the $Y_D$ axis and the $X_D$ axis may be changed according to the shape. For example, in the fourth shape of FIG. 4, a direction of a screen display in the display unit 17, when an upper side of the paper surface is displayed as a bottom, the direction of the $Y_D$ axis of the display-section coordinate system $X_DY_DZ_D$, may be let to be a downward direction of the paper surface and not an upward direction of the paper surface.

Moreover, in this embodiment, the coordinate conversion is let to be performed. However, it may be a conversion based on the shape-condition value, even thought it is not a coordinate conversion.

Moreover, in this embodiment, a mobile terminal is used as the information processing apparatus. However, it may be an information processing apparatus other than the mobile terminal, such as a portable information terminal and a game machine.

As described above, a method for information processing of the present invention is applicable to information processing in which a sensor which measures a moving condition is used. Moreover, an information processing apparatus of the present invention can be used in an information processing apparatus which is provided with a sensor which measures the moving condition. Moreover, a computer program for information processing of the present invention can be used in information processing in which the sensor which measures the moving condition is used.

What is claimed is:

1. A computer program product comprising instruction steps for operating an information processing apparatus that is configured to change into two or more different shapes, the method comprising the steps of:
   measuring movement of the information processing apparatus using a movement sensor to obtain a measured movement value;
   determining using a shape sensor, which of the two or more different shapes the information processing apparatus has; and
   converting the measured movement value into a converted movement value using a conversion procedure specific to the determined shape of the information processing apparatus.

2. The computer program product of claim 1, wherein the conversion procedure specific to the determined shape of the information processing apparatus is a coordinate conversion.

3. The computer program product according to claim 2, wherein the coordinate conversion procedure is a coordinate conversion from a sensor coordinate system which is fixed with respect to the movement sensor, to a display-section coordinate system which lets a direction of a display surface of a display device which is an output device of the information processing apparatus, to be one axial direction.

4. The computer program product according to claim 1, wherein the measured movement value is an acceleration value and an attitude angle value of the information processing apparatus.

5. The computer program product according to claim 1, wherein the conversion scheme is executed by a middleware in a software structure.

6. An information processing apparatus that is configured to change into two or more different shapes, comprising:
   a movement sensor arranged to measure movement of the information processing apparatus to obtain a measured movement value;
   a shape sensor, which provides a signal corresponding to the shape of the information processing apparatus; and
   a converting section arranged to convert the measured movement value into a converted movement value using a conversion procedure specific to the signal corresponding to the shape of the information processing apparatus.

7. The information processing apparatus according to claim 6, wherein the conversion procedure is a coordinate conversion.

8. The information processing apparatus according to claim 7, wherein the coordinate conversion is a coordinate conversion from a sensor coordinate system which is fixed with respect to the movement sensor, to a display-section coordinate system which lets a direction of a display surface of a display device which is an output device, to be one axial direction.

9. The information processing apparatus according to claim 6, further comprising a wireless communication section for communicating with a base station of a mobile communication network.

10. A computer program product comprising instruction steps for operating an information processing apparatus that is configured to change into two or more different shapes, the method comprising the steps of:
    measuring movement of the information processing apparatus using a movement sensor to obtain a measured movement value;
    determining using a shape sensor, which of the two or more different shapes the information processing apparatus has;
    converting the measured movement value into a converted movement value using based on the determined shape of the information processing apparatus; and
    notifying the converted movement value to a computer program, which uses the converted movement value.

* * * * *